United States Patent
Peterson

[19]

[11] Patent Number: 5,906,424
[45] Date of Patent: May 25, 1999

[54] LIGHTED VISOR MIRROR ASSEMBLY PROVIDING VARIABLE LIGHT INTENSITY

[75] Inventor: Don Mangas Peterson, West Bloomfield, Mich.

[73] Assignee: Lear Corporation, Southfield, Mich.

[21] Appl. No.: 08/797,775

[22] Filed: Feb. 7, 1997

[51] Int. Cl.⁶ .................................................. B60J 3/00
[52] U.S. Cl. .................... 362/135; 362/142; 362/144; 362/83.1; 296/97.5
[58] Field of Search .................................... 362/135, 140, 362/141, 142, 144, 83.1; 296/97.2, 97.5

[56] References Cited

U.S. PATENT DOCUMENTS

| | | | |
|---|---|---|---|
| Re. 35,622 | 10/1997 | Wilson | 296/97.2 |
| 4,648,011 | 3/1987 | Boote et al. | 362/135 |
| 4,809,140 | 2/1989 | Jonsas | 362/140 |
| 4,922,391 | 5/1990 | Dykstra | 362/144 |
| 4,947,296 | 8/1990 | Takeuchi et al. | 362/135 |
| 4,988,140 | 1/1991 | Van Order | 362/140 |
| 5,054,839 | 10/1991 | White et al. | 362/142 |
| 5,301,994 | 4/1994 | Wilson . | |
| 5,441,325 | 8/1995 | Toth et al. . | |
| 5,577,791 | 11/1996 | Viertel et al. | 296/97.5 |

*Primary Examiner*—Thomas M. Sember
*Attorney, Agent, or Firm*—Brooks & Kushman P.C.

[57] ABSTRACT

A lighted visor mirror assembly is provided. The lighted visor mirror assembly includes a mirror having a first side, a light source, and a door. The light source is located adjacent to the first side of the mirror. The door has a translucent portion and an opaque portion. As the door is moved from a closed position covering the mirror and the light source, to an open position uncovering the mirror, the translucent portion of the door is positioned with respect to the light source such that the intensity of the light from the light source passing through the translucent portion of the door is increased by progressively uncovering the light source.

23 Claims, 3 Drawing Sheets

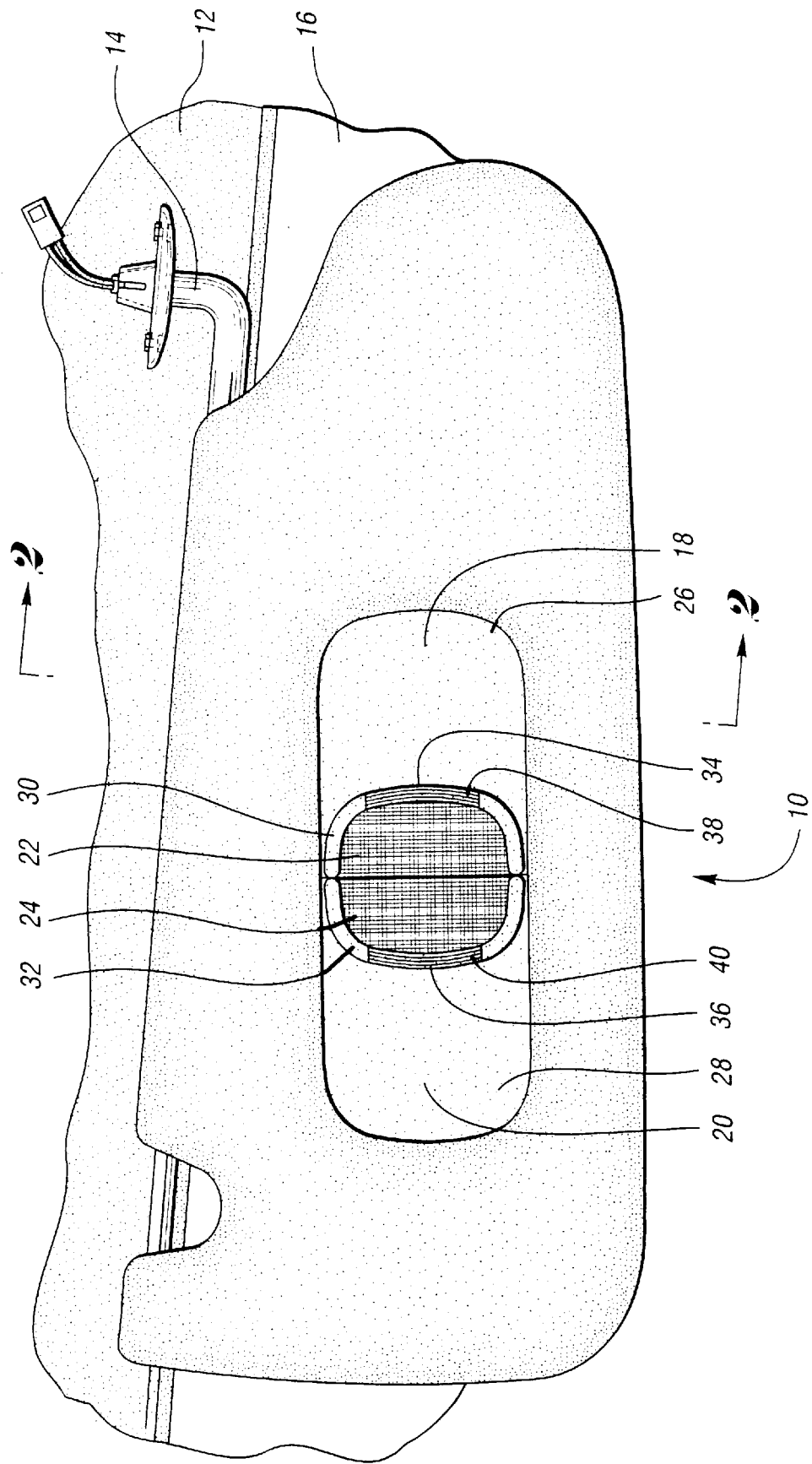

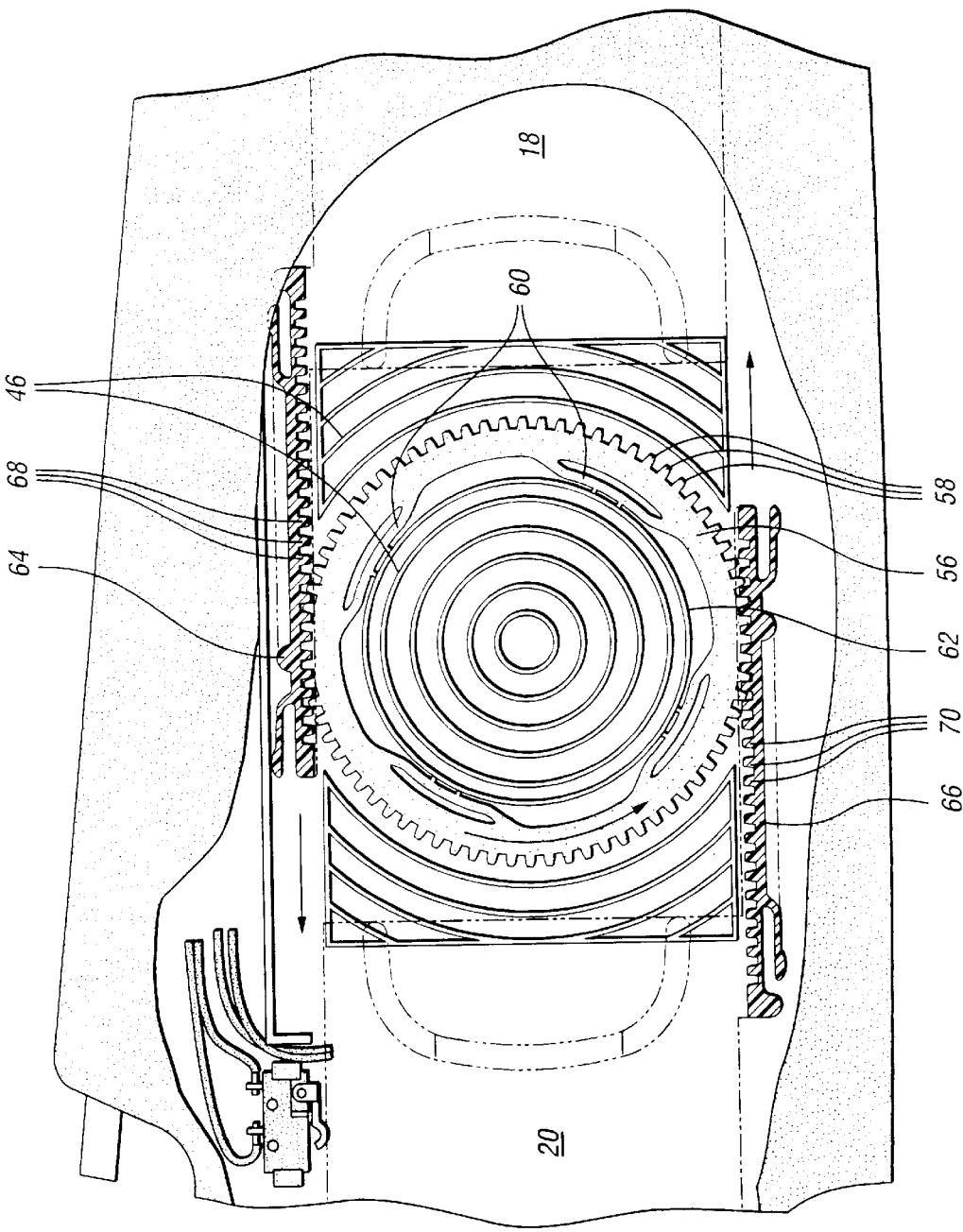
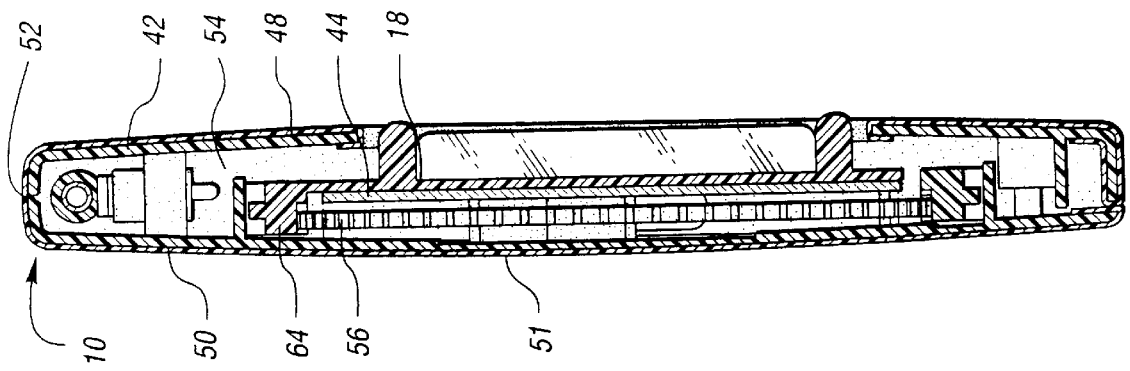

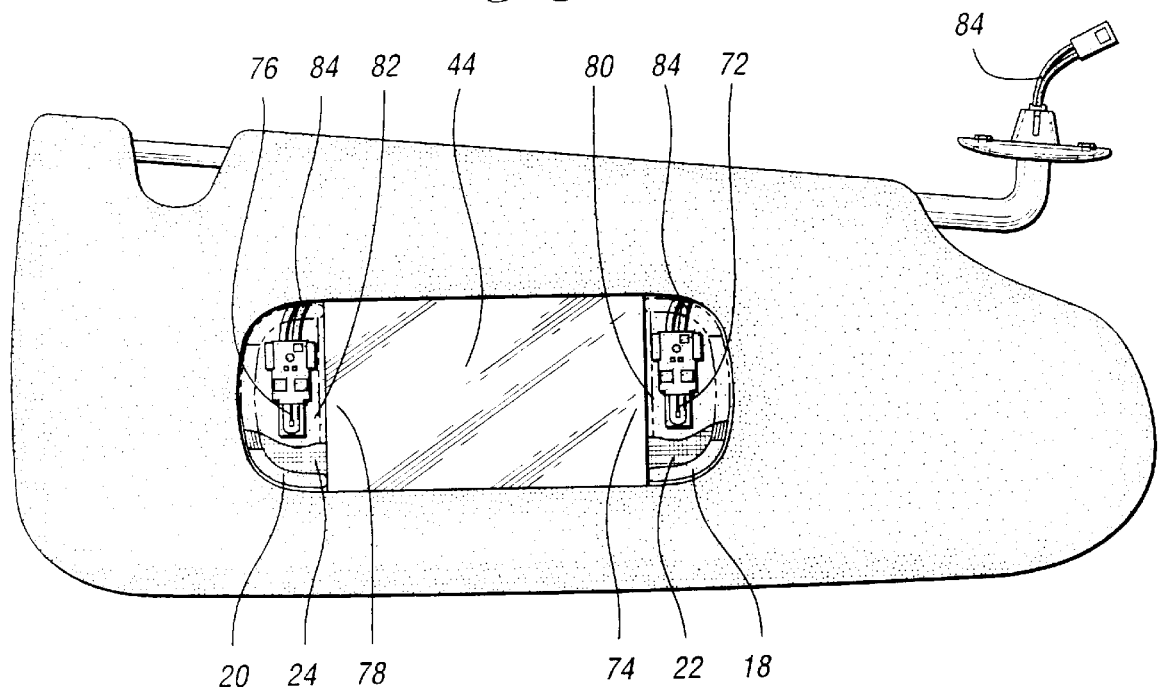
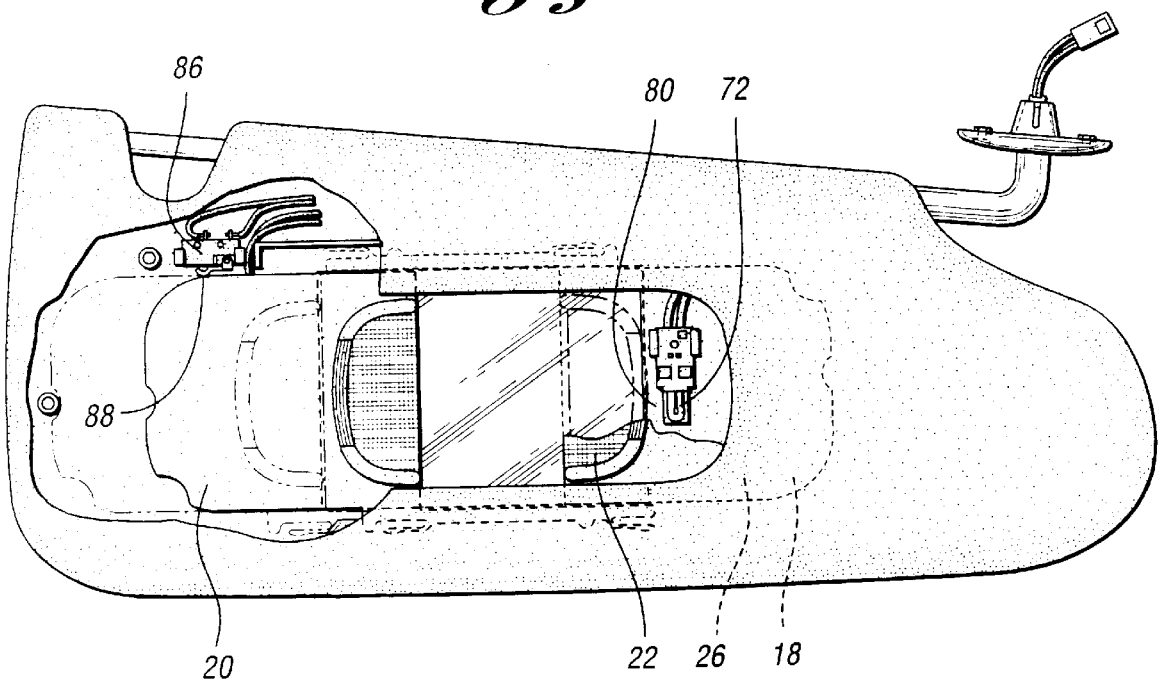

LIGHTED VISOR MIRROR ASSEMBLY PROVIDING VARIABLE LIGHT INTENSITY

TECHNICAL FIELD

This invention relates to a visor for a vehicle and, more particularly, to a lighted visor mirror assembly providing variable light intensity.

BACKGROUND ART

Sun visors in motor vehicles frequently include mirror assemblies, some of which provide illumination to facilitate use of the mirror in low light conditions. Typically, prior art visors have supplied this illumination through a light source attached to the visor and designed to emit light at either constant or variable intensity. In the latter case, the intensity of the light source is controlled by an electrical rheostat or potentiometer which varies the voltage applied to the light source. The intensity of the light emitted from the light source is proportional to the voltage applied to the light source. For example, as the rheostat or potentiometer increases the voltage applied to the light source, the intensity of the light source increases.

One shortcoming of known variable intensity lighted visors is that the light emitted at low intensity settings is yellowish in color, a condition which many users find less desirable than white light. Another shortcoming is that control of the light intensity through electrical means, such as a rheostat or potentiometer, increases the cost of the visor. Still another shortcoming is that control of the light intensity by way of electrical means is not entirely reliable.

SUMMARY OF THE INVENTION

An object of the present invention is to provide a lighted visor mirror assembly which supplies a variable light intensity.

Another object of the present invention is to provide a lighted visor mirror assembly which emits white light at a low intensity setting.

Another object of the present invention is to provide a lighted visor mirror assembly which is less expensive to assemble than prior art lighted visors.

Yet another object of the present invention is to provide a lighted visor mirror assembly in which the light intensity is controlled through mechanical means.

In carrying out the above objects and other objects, features, and advantages of the present invention, a lighted visor mirror assembly is provided. The lighted visor mirror assembly includes a mirror having a first side, a light source, and a door. The light source is located adjacent to the first side of the mirror. The door has a translucent portion and an opaque portion. As the door is moved from a closed position covering the mirror and the light source, to an open position uncovering the mirror, the translucent portion of the door is positioned with respect to the light source such that the intensity of the light from the light source passing through the translucent portion of the door is increased by progressively uncovering the light source.

The above objects and other objects, features, and advantages of the present invention will be readily apparent from the following detailed description of the best mode for carrying out the invention when taken in conjunction with the accompanying drawings.

BRIEF DESCRIPTION OF THE DRAWINGS

FIG. 1 is a fragmentary front elevational view of a lighted visor mirror assembly embodying the present invention mounted to a vehicle and shown with a first door and a second door in a closed position;

FIG. 2 is a cross-sectional view taken along lines 2—2 in FIG. 1;

FIG. 3 is a fragmentary front elevational view of a lighted visor mirror assembly with parts of the assembly broken away to show an intercoupling mechanism for controlling movement of the first and second doors;

FIG. 4 is a fragmentary front elevational view of the lighted visor mirror assembly with the first door and second door moved to an open position and with a translucent portion of each door broken away to show light sources thereunder; and FIG. 5 is a fragmentary front elevational view of the lighted visor mirror assembly with the first door and second door moved to an intermediate position to allow a low intensity light to pass through the translucent portion of each door.

BEST MODE FOR CARRYING OUT THE PRESENT INVENTION

FIG. 1 shows an improved lighted visor mirror assembly 10 in an interior 12 of a motor vehicle. The visor mirror assembly 10 includes an elbow mounting bracket 14 of conventional design for mounting the visor mirror assembly 10 generally above the vehicle windshield 16. The visor mirror assembly 10 is pivotable about the elbow mounting bracket 14 between a raised stored position adjacent the vehicle roof or headliner, and a lowered use position as shown in FIGS. 1, 4, and 5 covering the upper portion of the vehicle windshield 16.

Visor mirror assembly 10 includes a first door 18 and a complementary second door 20. First door 18 and second door 20 include translucent portions 22 and 24 and opaque portions 26 and 28 respectively. One skilled in the art will appreciate that translucent portions 22 and 24 may be replaced with transparent portions and still achieve the objectives of the present invention. In a preferred embodiment of the invention, translucent portions 22 and 24 are reflective lens.

Opaque portion 26 of first door 18 and opaque portion 28 of second door 20 define respective frames 30 and 32 shaped to receive translucent portions 22 and 24 respectively. Additionally, grasp portions 34 and 36 of frames 30 and 32 are provided for manually moving first door 18 and second door 20. Ribs 38 and 40 are included on the surface of each grasp portion 34 and 36 to provide a grip for moving the doors. In a preferred embodiment of the invention, opaque portions 26 and 28 are molded as unitary plastic pieces.

Referring to FIG. 2, the visor mirror assembly 10 includes a hollow shell 42 which has a mirror 44 attached to a pedestal structure 46 within the shell 42. Pedestal structure 46, best shown in FIG. 3, is made of plastic and consists as a series of generally concentric raised ribs. Shell 42 can be a molded plastic body of clamshell design having a hinged front housing portion 48 and a rear housing portion 50 covered by a suitable upholstery fabric or vinyl 51 compatible with the interior of the vehicle. Prior to assembly, the front housing portion 48 of shell 42 may pivot with respect to the rear housing portion 50 about a living hinge 52. When shell 42 is open, parts of the visor mirror assembly 10 may be installed. When shell 42 is closed, the interior housing of the hollow plastic core includes a hollow 54.

The first door 18 and the second door 20 are in opposed relation to each other. Specifically, first door 18 and second door 20 travel in opposite directions when moving between an extended doors-closed position, as shown in FIG. 1, and a retracted doors-open position, as shown in FIGS. 3 and 4. FIG. 3 shows an intercoupling mechanism used to control the movement of doors 18 and 20. A ring gear 56 synchronously moves doors 18 and 20 in opposite directions and through the same distance. Ring gear 56 is made of plastic and is formed with teeth 58 on its outer diameter and webs 60 on its inner diameter. Ring gear 56 is rotatably attached to an interior circular rib 62 of pedestal structure 46 through the deformation of webs 60.

First door 18 and second door 20 include a first rack 64 and second rack 66 respectively. First rack 64 and second rack 66 include teeth 68 and 70 respectively which are adapted to mesh with the teeth 58 of ring gear 56. As shown in FIG. 2, first rack 64 is offset from first door 18 such that first door 18 is located outboard of mirror 44 while first rack 64 meshes with ring gear 56 inboard of mirror 44. Second rack 66 is offset from second door 20 in a similar fashion.

In FIG. 3, doors 18 and 20 are shown in the open position. As door 18 is manually moved to a closed position, ring gear 56 is driven by rack 64 in a counter-clockwise direction thereby causing door 20 to synchronously move in a direction opposite of door 18. Similarly, as door 20 is manually moved to a closed position, ring gear 56 is driven by rack 66 in a counter-clockwise direction thereby causing door 18 to synchronously move in a direction opposite of door 20. Alternately, as door 18 is moved from a closed position to an open position, ring gear 56 is driven by rack 64 in a clockwise direction causing door 20 to synchronously move in a direction opposite of door 18. Finally, as door 20 is moved from a closed position to an open position, ring gear 56 is driven by rack 66 in a clockwise direction causing door 18 to synchronously move in a direction opposite of door 20.

FIG. 4 shows first door 18 and second door 20 in the open position. When first door 18 and second door 20 are moved to the open position, mirror 44 is uncovered. A first light source 72 is located adjacent to a first side 74 of mirror 44 underneath translucent portion 22. A second light source 76 is located adjacent a second side 78 of mirror 44 opposite the first side of mirror 44 underneath translucent portion 24. In FIG. 4, translucent portion 22 of first door 18 and translucent portion 24 of second door 20 are broken away to show the location of first light source 72 and second light source 76. The translucent portion of each door is removable from its frame to access the respective light source.

First light source 72 is spaced from the first side 74 of mirror 44 to form a gap 80. Second light source 76 is spaced from the second side 78 of mirror 44 to form a gap 82. In a preferred embodiment of the invention, light sources 72 and 76 are electrical bulbs. Power is supplied to light sources 72 and 76 via electrical wire harness 84. Electrical wire harness 84 is routed from light sources 72 and 76 through elbow mounting bracket 14 via the hollow 54 of visor mirror assembly 10, and is connected above the headliner to the electrical system of the vehicle. One skilled in the art will appreciate that other conventional means may be used as the light source.

FIG. 5 shows first door 18 and second door 20 in a position intermediate to the open and closed positions. As doors 18 and 20 are moved from the closed position shown in FIG. 1 toward the intermediate position, light sources 72 and 76 are switched on. That is, rated maximum voltage is applied to light sources 72 and 76 and, as a result, light sources 72 and 76 emit a high intensity of white light into gaps 80 and 82. Electrical switch 86 switches power to light sources 72 and 76 when door 20 contacts switch arm 88. Electrical switch 86 is preferably spaced from door 20 such that light sources 72 and 76 are switched on when translucent portion 22 of door 18 begins to uncover gap 80. If light sources 72 and 76 are switched on prior to translucent portion 22 of door 18 uncovering gap 80, stray light may escape from the visor mirror assembly 10. With door 18 located in the intermediate position, a low intensity of white light passes through the translucent portion 22 of door 18. No light is emitted from visor mirror assembly 10 when the opaque portion 26 of door 18 fully covers gap 80.

As door 18 moves from the intermediate position to the open position, the translucent portion 22 of door 18 progressively uncovers more of gap 80 and the intensity of white light passing through the translucent portion 22 proportionally increases. Likewise, as door 18 moves from the open position to the intermediate position, the opaque portion 26 of door 18 progressively covers more of gap 80 and the intensity of white light passing through the translucent portion 22 proportionally decreases. Finally, as door 18 moves from the intermediate position to the closed position, light source 72 is switched off. Door 20 operates in a manner similar to door 18.

As discussed above, in the preferred embodiment of the invention, translucent portions 22 and 24 are reflective lens comprising a series of relatively fixed prisms. As the doors 18 and 20 move from the closed position to the open position, these prisms move with respect to the light sources 72 and 76. The resulting diffusion of light through these specific reflective lens results in an initially wide dispersion of light to a narrow dispersion of light which focuses upon the user's face.

It is to be understood, of course, that while the forms of the invention described above constitute the best mode contemplated of practicing the present invention, the preceding description is not intended to illustrate all possible forms thereof. It is also to be understood that the words used are words of description, rather than of limitation, and that various changes may be made without departing from the spirit and scope of the present invention, which should be construed according to the following claims.

I claim:

1. A lighted visor mirror assembly comprising:

a mirror having a first side;

a light source adjacent the first side of the mirror; and a door having a translucent portion and an opaque portion, the door being movable with respect to the light source between a closed position covering the mirror and the light source, and an open position uncovering the mirror, the opaque portion of the door cooperating with the first side of the mirror as the door moves to the open position to progressively position the translucent portion of the door with respect to the light source so that the intensity of the light from the light source passing through the translucent portion of the door is increased by progressively uncovering the light source.

2. The lighted visor mirror assembly of claim 1, wherein the translucent portion of the door is a lens for diffusing the light as the light source is progressively uncovered.

3. The lighted visor mirror assembly of claim 1, wherein the translucent portion of the door comprises a transparent portion.

4. The lighted visor mirror assembly of claim 1, wherein the light source comprises an electric bulb.

5. The lighted visor mirror assembly of claim 1, wherein the light source is spaced from the first side of the mirror to form a gap, and the opaque portion uncovers the gap as the door moves to the open position.

6. The lighted visor mirror assembly of claim 5, including means for energizing the light source before the opaque portion uncovers the gap.

7. The lighted visor mirror assembly of claim 1, wherein the opaque portion of the door defines a frame for receiving the translucent portion, the translucent portion being removable from the frame for accessing the light source.

8. The lighted visor mirror assembly of claim 7, wherein the frame includes a grasp portion for manually moving the door.

9. The lighted visor mirror assembly of claim 7, wherein the opaque portion of the door is a unitary plastic piece.

10. The lighted visor mirror assembly of claim 1 further comprising a second light source adjacent a second side of the mirror opposite the first side of the mirror, and a second door having a translucent portion and an opaque portion, the second door being movable with respect to the second light source between a closed position covering the mirror and the second light source, and an open position uncovering the mirror, the opaque portion of the second door cooperating with the second side of the mirror as the second door moves to the open position to progressively position the translucent portion of the second door with respect to the second light source so that the intensity of the light from the second light source passing through the translucent portion of the second door is increased by progressively uncovering the second light source.

11. The lighted visor mirror assembly of claim 10, including intercoupling means for both doors such that movement of either door synchronously moves the other door in an opposite direction and through the same distance.

12. A lighted visor mirror assembly comprising:
a mirror;
a light source adjacent a first side of the mirror, the light source emitting light of a predetermined wavelength at a constant intensity; and
a door having a translucent portion and an opaque portion, the door being movable with respect to the light source between a closed position covering the mirror and the light source, and an open position uncovering the mirror,
the opaque portion of the door cooperating with the first side of the mirror as the door moves to the open position to progressively position the translucent portion of the door with respect to the light source so that the intensity of the light from the light source passing through the translucent portion of the door is increased by progressively uncovering the light source.

13. The lighted visor mirror assembly of claim 12, wherein the translucent portion of the door is a lens for diffusing the light as the light source is progressively uncovered.

14. The lighted visor mirror assembly of claim 12, wherein the translucent portion of the door is a transparent portion.

15. The lighted visor mirror assembly of claim 12 wherein the light source is an electric bulb.

16. The lighted visor mirror assembly of claim 12, wherein the light source is spaced from the first side of the mirror to form a gap and the opaque portion uncovers the gap as the door moves to the open position.

17. The lighted visor mirror assembly of claim 16, including means for energizing the light source before the opaque portion uncovers the gap.

18. The lighted visor mirror assembly of claim 12, wherein the opaque portion of the door defines a frame for receiving the translucent portion, the translucent portion being removable from the frame for accessing the light source.

19. The lighted visor mirror assembly of claim 18, wherein the frame includes a grasp portion for manually moving the door.

20. The lighted visor mirror assembly of claim 18, wherein the opaque portion of the door is a unitary plastic piece.

21. The lighted visor mirror assembly of claim 12, including a second light source adjacent a second side of the mirror opposite the first side of the mirror, and a second door having a translucent portion and an opaque portion, the second door being movable with respect to the second light source between a closed position covering the mirror and the second light source, and an open position uncovering the mirror, the opaque portion of the second door cooperating with the second side of the mirror as the second door moves to the open position to progressively position the translucent portion of the second door with respect to the second light source so that the intensity of the light from the second light source passing through the translucent portion of the second door is increased by progressively uncovering the second light source.

22. The lighted visor mirror assembly of claim 21, including intercoupling means for both doors such that movement of either door synchronously moves the other door in an opposite direction and through the same distance.

23. A lighted visor mirror assembly comprising:
a mirror;
a first light source adjacent a first side of the mirror;
a first door having a translucent portion and an opaque portion, the first door being movable with respect to the first light source between a closed position covering the mirror and the first light source, and an open position uncovering the mirror,
the opaque portion of the first door cooperating with the first side of the mirror as the first door moves to the open position to progressively position the translucent portion of the first door with respect to the first light source so that the intensity of the light from the first light source passing through the translucent portion of the first door is increased by progressively uncovering the first light source;
a second light source adjacent a second side of the mirror opposite the first side of the mirror;
a second door having a translucent portion and an opaque portion, the second door being movable with respect to the second light source between a closed position covering the mirror and the second light source, and an open position uncovering the mirror,
the opaque portion of the second door cooperating with the second side of the mirror as the second door moves to the open position to progressively position the translucent portion of the second door with respect to the second light source so that the intensity of the light from the second light source passing through the translucent portion of the second door is increased by progressively uncovering the second light source; and
intercoupling means for the first door and the second door such that the movement of either door synchronously moves the other door in an opposite direction and through the same distance.

* * * * *